United States Patent [19]
Herbst et al.

[11] Patent Number: 5,666,995
[45] Date of Patent: Sep. 16, 1997

[54] PILOT RELAY VALVE INCLUDING MEANS TO CONTROL FLOW THROUGH A BALANCE ORIFICE

[75] Inventors: Robert J. Herbst, Avon; Duane R. Johnson, Wellington, both of Ohio

[73] Assignee: AlliedSignal Truck Brake Systems Co., Elyria, Ohio

[21] Appl. No.: 651,067

[22] Filed: May 21, 1996

[51] Int. Cl.⁶ .................................................. F15B 13/042
[52] U.S. Cl. ........................................... 137/627.5; 303/40
[58] Field of Search ............................. 137/627.5; 303/40

[56] References Cited

U.S. PATENT DOCUMENTS

| | | | |
|---|---|---|---|
| 4,181,367 | 1/1980 | Herring | 303/40 X |
| 4,620,567 | 11/1986 | Kurtz | 137/627.5 |
| 5,261,458 | 11/1993 | Johnson et al. | 137/627 |

*Primary Examiner*—Gerald A. Michalsky
*Attorney, Agent, or Firm*—Howard G. Massung

[57] ABSTRACT

A pilot operated relay valve (10) for an air pressure braking system includes a relay piston (16) which is responsive to the pressure at a control port (20) to open the valve (10) so that it's inlet port (38) is in free communication with it's outlet port (24). The relay piston (16) includes a balance orifice (26) which permits the outlet port (24) to communicate with the control port (20) to equalized or balance the pressure differential therebetween. A shut off valve arrangement (80,82) or a check value (90 or 92) is provided to shutoff or control flow through the balance orifice during rapid release modulation of the pressure signal for braking applied to the control port (20).

7 Claims, 4 Drawing Sheets

5,666,995

PILOT RELAY VALVE INCLUDING MEANS TO CONTROL FLOW THROUGH A BALANCE ORIFICE

BACKGROUND OF THE INVENTION

1. Field of the Invention

This invention relates to a relay valve for a fluid braking system and more particularly to a pilot controlled air relay valve.

2. Description of Prior Art

Tractor-trailer combination vehicles are equipped with braking systems in which a vehicle operator generated a control signal by operation of the brake control valve in the operator's compartment. This control signal is transmitted to relay valves, which respond to the control signal to communicate compressed air from storage reservoirs to vehicle foundation brakes. The control signal must be communicated to the relay valves on the trailer through a pneumatic conduit which connects the tractor and the trailer.

More recently, so-called "turnpike trains" have become common, in which a single tractor pulls two or three trailers. Accordingly, the control signal generated by the vehicle operator must be transmitted through the first trailer to operate relay valves on the second and even a third trailer. However, when the control signal reaches the second and third trailers, it has become so slowed that unstable braking may result. Accordingly, it has become necessary to use pilot relay valves on the trailers to speed up the control signal. In other words, the control signal is used to operate a pilot relay valve, the outlet of which becomes the control signal transmitted to that trailer and each succeeding trailer. Obviously, it is desirable that such pilot relay valves used to generate control signal's have an extremely small pressure differential between the control port and the outlet or delivery port, to provide nearly equal pressure at all brakes. It is also desirable that such relay valves react as quickly as possible to the control signal transmitted to the control port to minimize time delay. Accordingly, it is desirable that the crack-open pressure, at which such a relay valve opens, be as small as possible to provide adequate responsive control during braking.

A pilot relay valve is disclosed in U.S. Pat. No. 5,261,458 which is specifically designed to accelerate the brake control signal on air-braked vehicles while maintaining a zero control/delivery pressure differential. This pilot relay valve includes a relay piston, which is operable in response to the control signal to open the valve, having an orifice there through which permits the control pressure volume to communicate with the valve outlet. The orifice permits pressures to equalize so that pressure communicated through the outlet port will equalize or balance with the pressure at the control port, to provide and maintain a zero pressure differential between the control port and the outlet port.

Non-pilot relay valves do an excellent job of accelerating control signals but generally cause pressure differentials, typically 2 to 4 psi, which directly relate to air brake system imbalance. This system imbalance or pressure differential is additive on double or triple trailer combinations and is a direct cause of vehicle instability. The inventors have observed that a pilot relay valve, as described above, while maintaining zero control/delivery pressure differential is somewhat slower than a non-pilot relay valve, primarily during release, due partially to the balance orifice in the relay piston. On some vehicle combinations, such as double and triple trailer units, brake response timing and dynamic balance are generally less than desirable as far as system transmission timing is concerned.

SUMMARY OF THE INVENTION

The present invention provides a pilot relay valve which includes a relay piston, operable in response to a control signal applied to a control port to rapidly open the valve and allow free communication between the inlet port and the outlet port, including a balance orifice which permits the outlet port to communicate with the control port and wherein flow through the balance orifice is controlled to momentarily check the main delivery volume, through the outlet port, from communicating with the control volume, at the control port, during rapid release modulation of the control pressure signal and still allow free flow through the balance orifice in both directions during slow to moderate control signal modulation. By checking flow through the balance orifice during rapid control pressure modulation full delivery pressure is then available to act on the total area of the relay piston. This causes rapid movement of the relay piston to modulate the main delivery compressed air flow resulting in faster transmission times while maintaining minimal apply/delivery differential during service brake operation.

BRIEF DESCRIPTION OF DRAWINGS

For a better understanding of the invention reference may be had to the preferred embodiments exemplary of the invention shown in the accompanying drawings in which.

DETAILED DESCRIPTION OF THE PREFERRED EMBODIMENTS

Figure 1:
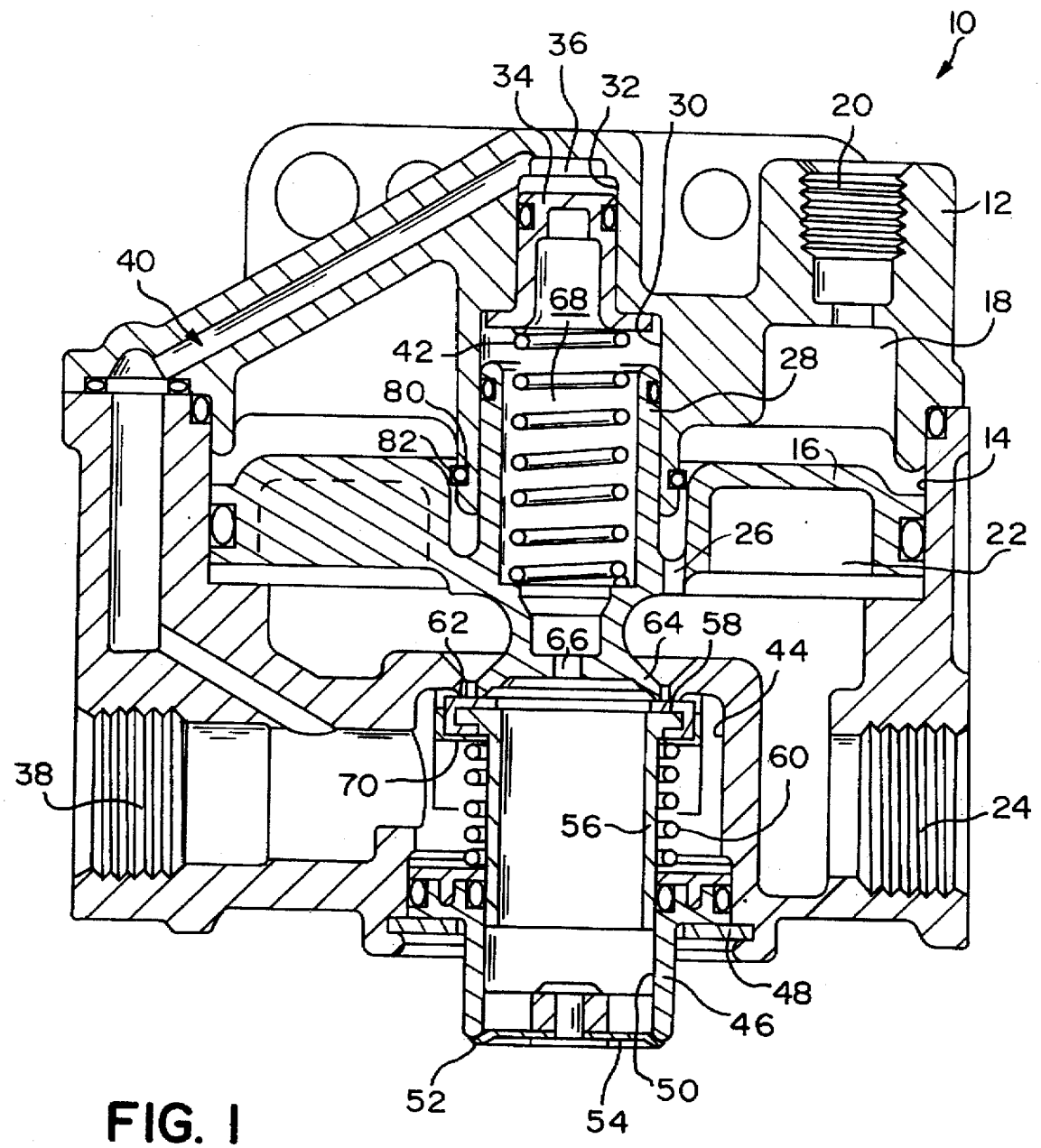
FIG. 1 is a is a cross-sectional view of a pilot relay valve according to the present invention.

Referring now to the drawings and FIG. 1 in particular there is shown an improved relay valve 10, according to the teaching of the present invention. The relay valve generally indicated by the numeral 10 includes a housing 12 defining a bore 14 therewithin. A relay piston 16 is slidably mounted in the bore 14 and cooperates with the housing 12 to define a control volume 18 between one side of the relay piston 16 and the housing 12 which communicates with a control port 20. An outlet or delivery volume 22 is defined between the opposite side of the relay piston 16 and the housing 12, and is communicated to a delivery or outlet port 24. An orifice 26 communicates the control volume 18 with the delivery or outlet volume 22.

Relay piston 16 further includes an extension 28 which is slidably received in secondary bore 30 defined within the housing 12. Secondary bore 30 is counterbored as at 32. The counterbore 32 slidably receives a load piston 34. Load piston 34 cooperates with the housing 12 to define a load volume 36 therebetween, which is communicated with a supply or inlet port 38 through passages generally indicated by the numeral 40. Supply or inlet port 38 is communicated to a fluid pressure source, such as a compressed air storage reservoir. A reserve spring 42 yieldably biases the relay piston 16 and the load piston 34 apart, but at pressure levels above approximately 70 psi, reserve spring 42 yields to permit load piston 34 to engage relay piston 16.

The housing 12 defines still another bore 44 which communicates with the inlet or supply port 38. A separate housing member 46 is sealingly engaged with the bore 44 and retained therein by a retaining ring 48. Member 46 defines a bore 50 which communicates with an exhaust port 52. A conventional resilient valve member 54 closes the exhaust port 52, but permits fluid pressure to exhaust out of the port 52 while preventing environmental contaminants from entering the port 52.

A combination inlet/exhaust valve 56 is slidably mounted in the bore 50 and is provided with a sealing surface 58. An inlet/exhaust spring 60 urges the inlet/exhaust valve member 56 upward, as viewed FIG. 1, thereby urging the sealing surface 58 into sealing engagement with a circumferentially extending inlet valve seat 62 which circumscribes the bore 44. The relay piston 16 carries a circumferentially extending exhaust valve seat 64 which is brought into sealing engagement with the sealing surface 58 when communication between the outlet or delivery volume 22 is to be cut off from the exhaust port 52. An orifice 66 in relay piston 16 communicates the volume 68 defined within the extension 28 and within the load piston 34 with the exhaust port 52. Inlet/exhaust valve 56 further includes a fluid pressure responsive surface 70 against which pressure at supply or inlet port 38 acts. The surface 70 defines an unbalanced fluid pressure area so that the pressure at port 38 supplements the force of spring 60 in holding the sealing surface 58 against the valve seat 62.

In operation, the various components of the relay valve 10 are illustrated in FIG. 1 in the steady state positions which they assume when pressure at the control port is vented and the brakes are released. In this condition, reservoir pressure communicated through port 38 acts across the effective area of the surface 70 to supplement the spring 60 in holding sealing surface 58 against the seat 62. However, pressure at port 38 is also communicated to load volume 36 through the passages 40, and acts against load piston 34, thereby biasing the relay piston downward and thereby also exerting a biasing force on the valve member 56 which opposes the biasing force of spring 60 and of inlet pressure acting against the surface 70. The relay piston 16 is also biased downward by the spring 42, the force of which is smaller than the spring 60. At a predetermined supply pressure of approximately 70 psi, spring 42 yields and relay piston 16 engages inlet/exhaust valve 56. The effective area of the load piston 34 is slightly smaller than the effective area of the surface 70'. Accordingly, the inlet/exhaust valve 56 remains sealingly engaged with the valve seat 62. The biasing force exerted on the relay piston 16 by the load piston 34, which loads the valve seat 64 against the surface 58 in combination with the spring 42, is greater than the force applied to the valve member 56 by the spring 60 at supply pressures above approximately 100 psi. However, since the downward biasing force applied to the inlet/exhaust valve member 56 by the load piston 34 acting through the relay piston 16 is balanced by the fluid pressure at the supply or inlet port 38 acting against the effective area of surface 70 the inlet/exhaust valve 56 remains in engagement with valve seat 62. It will be recognized, of course, that the fluid pressure at the port 38 is applied both to the surface 70 and to load piston 34.

Figure 3:
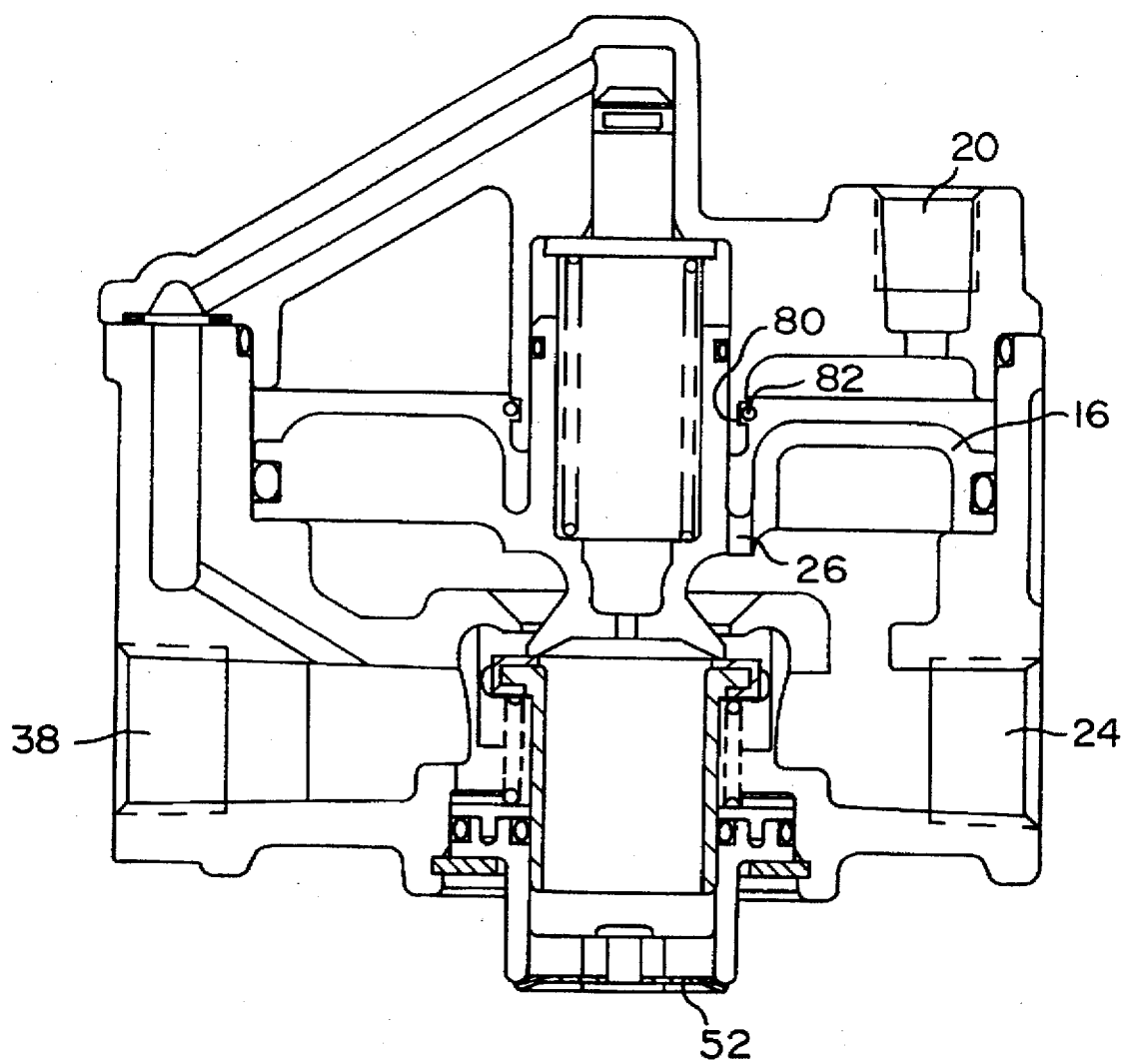
FIG. 3 is a view similar to FIG. 2 showing the valve in the full open position with the inlet port in free communication with the outlet port.

When a brake application is effected, a pressure signal is transmitted through control port 20 into control volume 18, where it acts against the relay piston 16, urging the latter downward, as shown in FIG. 3. Since the aforementioned biasing force exerted by the piston 34 is greater than the force exerted on the inlet/exhaust valve member 56 by the spring 60, any small increase in pressure in the control volume 18 will force the relay piston 16 and the valve member 56 downward causing fluid pressure to communicate from the inlet port 38 into the outlet or delivery volume 22, where it is communicated through the outlet port 24 to effect a brake application. The orifice 26 permits pressures to equalize between the volumes 18 and 22, so that pressure communicated through outlet port 24 will equalize with the pressure to the control port 20, to provide and maintain a zero pressure differential between the control port 20 and the outlet port 24.

Figure 2:
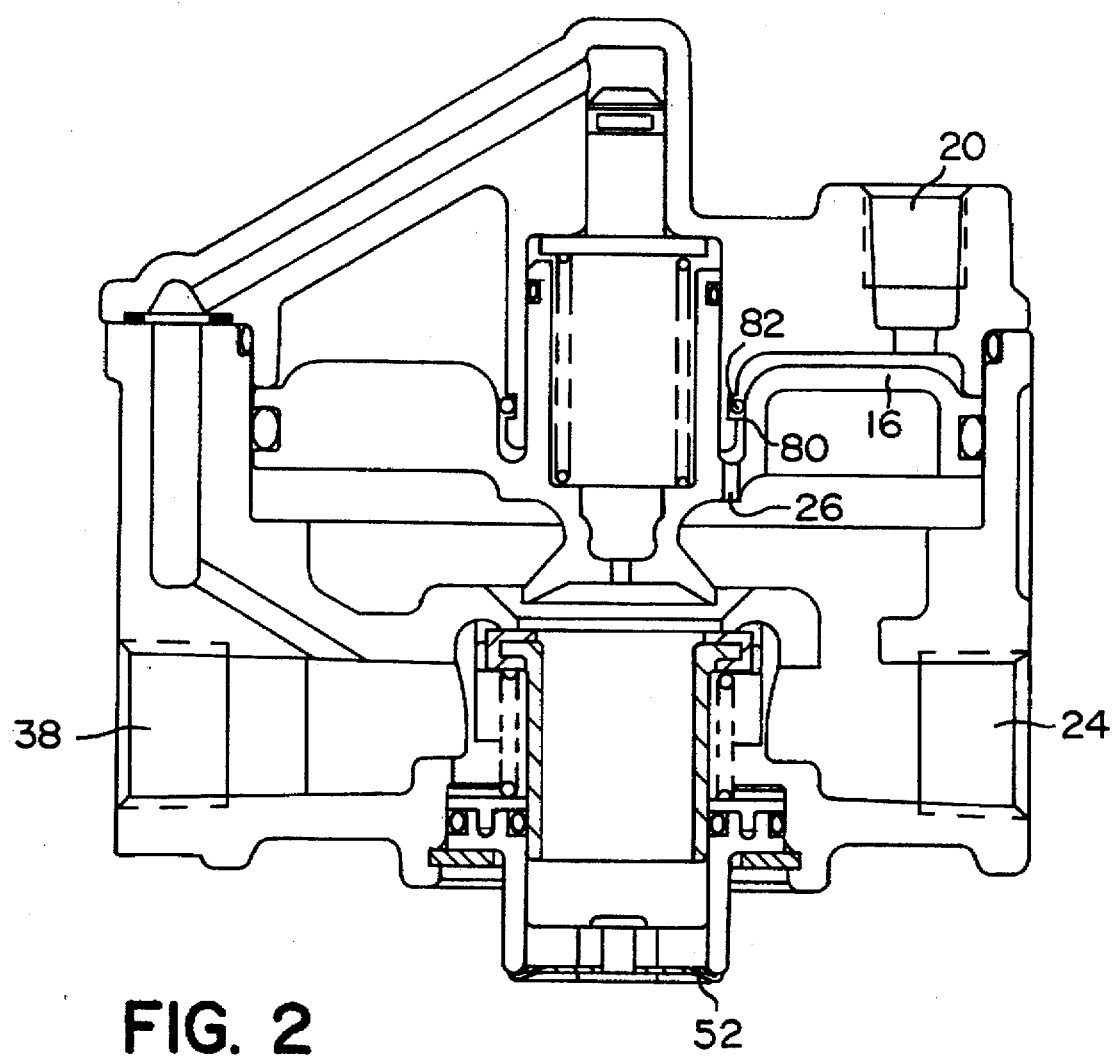
FIG. 2 is a simplified cross-sectional view of the valve shown in FIG. 1 showing the valve closing and the outlet port vented to atmosphere.

When the vehicle operator releases the brakes, the pressure at control port 20 is vented. Accordingly, the pressure level in the outlet volume 22 urges the relay piston 16 upward permitting the sealing surface 58 of inlet/exhaust valve member 56 to reengage the inlet valve seat 62, thereby closing off communication from the inlet port 38 to the outlet port 24 through the volume 22. The exhaust valve seat 64 carded by the piston 16 is then lifted off the sealing surface 58, as shown in FIG. 2, permitting high pressure at the outlet port 24 and in the volume 22 to exhaust to atmosphere through the exhaust port 52. Because the effective area of the relay piston 16 against which pressure in the volume 22 acts is much greater than the effective area of load piston 34, the fluid pressure at outlet port 24 will be exhausted to a low level even though the load volume 36 remains communicated with reservoir pressure present at inlet port 38.

An O-ring 82 is disposed in an annular grove 80 which extends around the outside of housing 12 which defines the bore 30 and acts as a guide for relay piston 16. The O-ring 82 acts as a shut off valve for the balance orifice 26 to momentarily close the relay piston balance orifice 26 during rapid release modulation of valve 10 resulting in improved release timing of the valve 10. As shown in FIG. 2, when relay piston 16 rises, O-ring 82 engages a portion of relay piston 16 and seals off volume 22 from volume 18 when control port 20 is rapidly vented. This prevents the pressure in volume 22 from being dissipated through balance orifice 26 when relay piston 16 rises rapidly. The addition of the O-ring 82 acts as a shutoff valve for the balance orifice 26 to momentarily check the air delivery circuit from the air control circuit during rapid release modulation of the control pressure signal and still allows free flow through the balance orifice 26 in both directions during slow to moderate control signal modulation. This ensures minimum control/delivery pressure differential and maximum exhaust capacity. By checking the balance orifice 26 during rapid release of control pressure, full delivery pressure is then available to act on the total area of the relay piston 16. This causes the relay piston to move to the fully released position, maximizing the exhaust valve 56 capacity. As the delivery pressure is exhausted the force created by the load piston 34 acting on the relay piston 16 moves the relay piston 16 down reopening the balance orifice 26 and closing the exhaust valve 56. The pressure equalizes across the relay piston 16 and the pressure at port 24 drops to a low level through orifice 26. The end result is faster release timing, similar to a standard relay valve, while maintaining minimal apply/ delivery pressure differential during service brake operation.

When the forces applied to the relay piston 16 by fluid pressure in volume 22 and in the load volume 36 equalize, the exhaust valve seat 64 is urged back into sealing engagement with the sealing surface 58 by spring 42 and air load on piston 34 and the residual pressure in volume 22 is exhausted through the orifice 26 and through the control port 20. The valve is then in its initial position as shown in FIG. 1, in which a biasing force is exerted through the relay piston 16 to the valve member 56 by inlet fluid pressure acting against the load piston 34.

In case of a malfunction, in which the reservoir feeding the inlet port 38 is without pressure, it is still desirable to communicate a control signal to the valves fed by the outlet port 24. Accordingly, the spring 42 maintains the exhaust seat 64 in sealing engagement with the sealing surface 58, even if the pressure level at inlet port 38 drops to atmospheric pressure. Since the spring 42 has a lighter load than the spring 60, the sealing surface 58 will be maintained in sealing engagement with the inlet valve seat 62. Accordingly, when a brake application is effected and pressure is communicated through control port 20 into volume 18, pressure in volume 18 will be fed to outlet or delivery port 24 through the orifice 26 and the volume 22. Although the signal will be relatively slow, pressure will be available through the outlet port 24 to provide braking.

Figure 4:
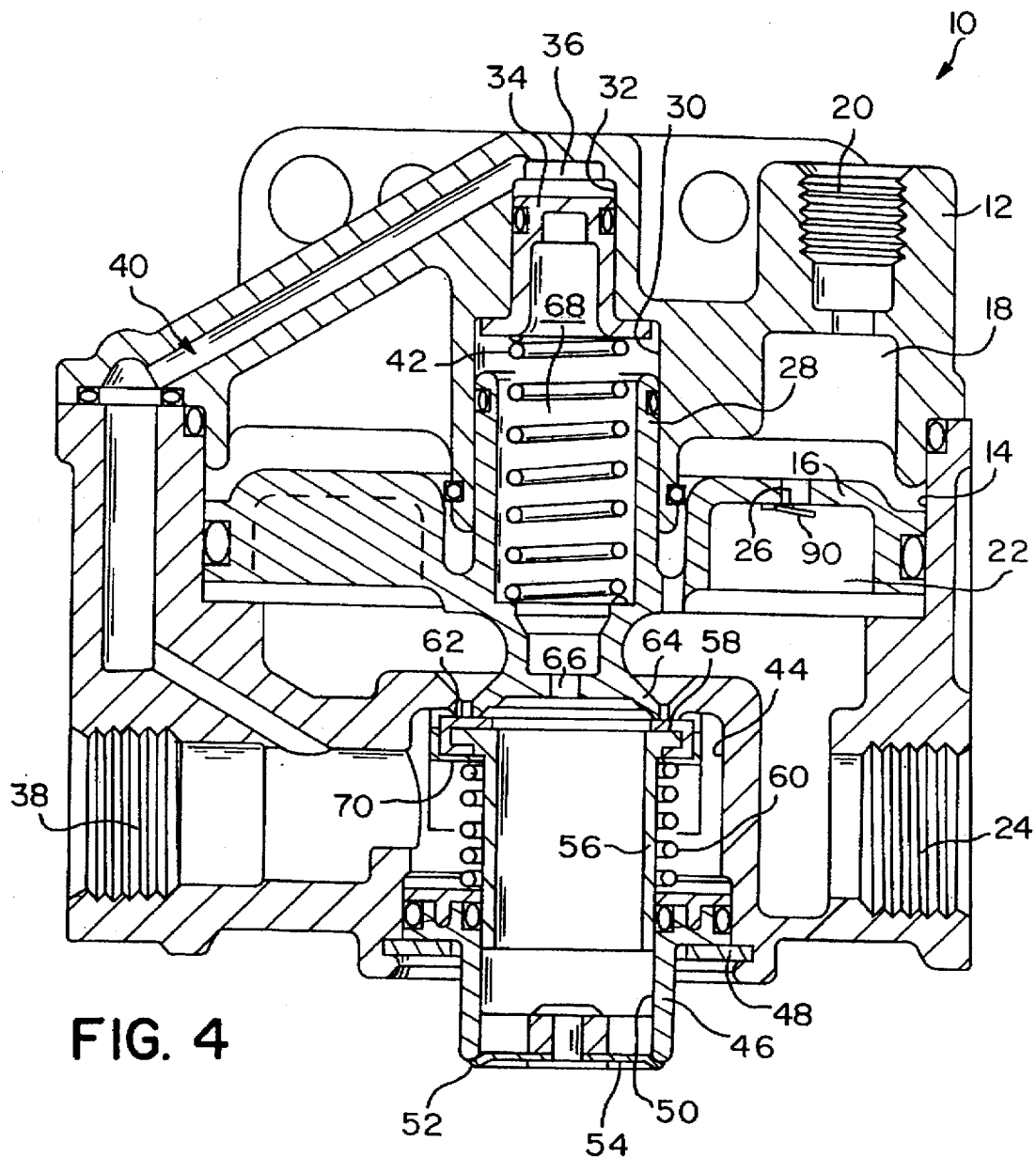
FIG. 4 is a is a cross-sectional view of another embodiment of a pilot relay valve according to the present invention.
Figure 5:
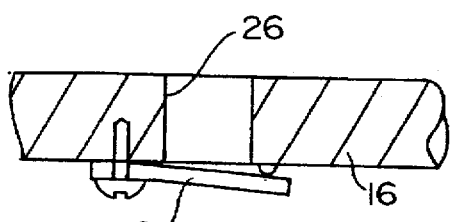
FIG. 5 is a an enlarged view of the balance orifice, shown in the relay valve of FIG. 4, including a check valve; and, FIG. 6 is an enlarged view of a balance orifice for a pilot relay valve, similar to the valve of FIG. 4, including a biased double check valve.

Referring now to FIGS. 4 and 5 there is shown another embodiment of the invention in which a flow sensitive single check valve 90 is used to seal the balance orifice during fast release modulation of the pilot relay valve 10 and still allow free flow during slower valve modulation to maintain zero pressure differential. This embodiment will enhance the release timing of the valve and still allow free flow of air through the balance orifice 26 during brake applications, ensuring normal valve operation in the event of a supply circuit failure.

Figure 6:
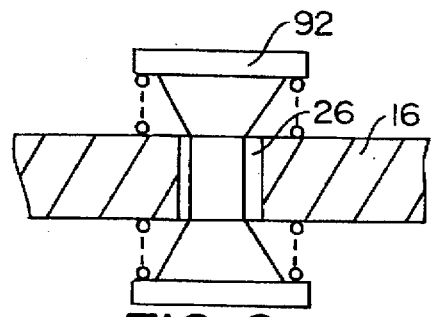

Referring now to FIG. 6 there is shown yet another embodiment wherein a double ended check valve 92 is disposed in the balance orifice 26. The addition of the flow sensitive double check valve 92 in the balance orifice of the relay piston 16 will check the delivery circuit from the control circuit during rapid modulation of the air pressure at control port 20 but allow free flow through the orifice in both directions during slow to moderate control signal modulation, ensuring minimal control/delivery pressure differential. By checking the balance orifice during rapid control pressure modulation, full delivery pressure is then available to act on the total area of the relay piston 16. This causes rapid movement of the relay piston 16 to modulate the delivery air. It should be noted in the event of a supply circuit failure of pilot relay valve 10 the balance orifice 26 in relay piston 16 must remain open so that the control signal can flow through it and on to the remaining valves in the system. Double ended check valve 92 must be overridden when the pilot relay valve 10 is in the full applied position so as not to block the balance orifice 16 when valve 10 is in the failed mode.

A major advantage of a pilot relay valve 10 according to the present invention is that it provides improvement to the pilot relay valve timing while maintaining minimal control/ delivery differential. Increasing the sensitivity of a pilot relay valve while maintaining its' zero pressure differential characteristics could potentially allow the pilot relay valve to be used as the normal service brake relay valve on tractors, trailers, straight trucks and busses. These vehicles could benefit from a zero differential system while maintaining the speed of a relay valve system. The improved pilot relay valve 10 can contribute to improved vehicle stability and increased braking efficiency.

We claim:

1. A pilot operated pneumatic relay valve comprising:
    a housing having an inlet port, an outlet port, an exhaust port, and a control port;
    valve means for controlling communication between said inlet port, said outlet port, and said exhaust port;
    a relay piston slidably mounted in said housing and responsive to the pressure level at said control port for operating said valve means;
    a balance orifice extending through said relay piston which permits free communication between said control port and said outlet port; and,
    shutoff valve means disposed between said control port and said outlet port for shutting off for a short period of time communication through said balance orifice between said control port and said outlet port when the air signal applied to said control port is abruptly removed and said relay piston moves to a position permitting communication between said outlet port and said exhaust port.

2. A pilot operated pneumatic relay valve as claimed in claim 1 wherein said shutoff valve means comprises a check valve disposed on said relay piston.

3. A pilot operated pneumatic relay valve as claimed in claim 1 wherein said shutoff valve means comprises a double ended check valve at least partially disposed within said balance orifice.

4. A pilot operated pneumatic relay valve as claimed in claim 1 wherein said shutoff valve means comprises:
    an O-ring disposed to engage said relay piston when said relay piston moves to a position permitting communication between said outlet port and said exhaust port.

5. A pilot operated relay valve comprising:
    a housing having an inlet port, an outlet port, an exhaust port, and a control port;
    valve means for controlling communication between said inlet port, said outlet port, and said exhaust port;
    a relay piston slidably mounted in said housing and responsive to the pressure level at said control port for operating said valve means;
    pressure responsive biasing means for applying a biasing force on said relay piston independent of the pressure level at said control port;
    said pressure responsive biasing means including a fluid pressure effective area responsive to the pressure level at said inlet port;

said biasing force being generated by the fluid pressure at said inlet port acting against said effective area;

said valve means including a spring device yieldably urging said valve means to a position closing said inlet port and acting on said valve means in a direction opposite to the force applied to said valve means by said biasing means;

spring means yieldably urging said relay piston into engagement with said valve means with a force less than the force exerted by said spring device;

an orifice communicating said control port with said outlet port; and, shutoff valve means disposed between said control port and said outlet port for shutting off for a short period of time communication between said control port and said outlet port through said office when the air signal applied to said control port is rapidly modulated.

6. A pilot operated pneumatic relay valve as claimed in claim 5 wherein said shutoff valve means comprises:

an O-ring disposed to engage said relay piston, when said relay piston moves to a position permitting communication between said outlet port and said exhaust port, to restrict flow through said office.

7. A pilot operated pneumatic relay valve as claimed in claim 6 wherein said shutoff valve means comprises a check valve disposed on said relay piston proximate to said office to prevent flow through said office from said outlet port to said control port.

* * * * *